2,474,341

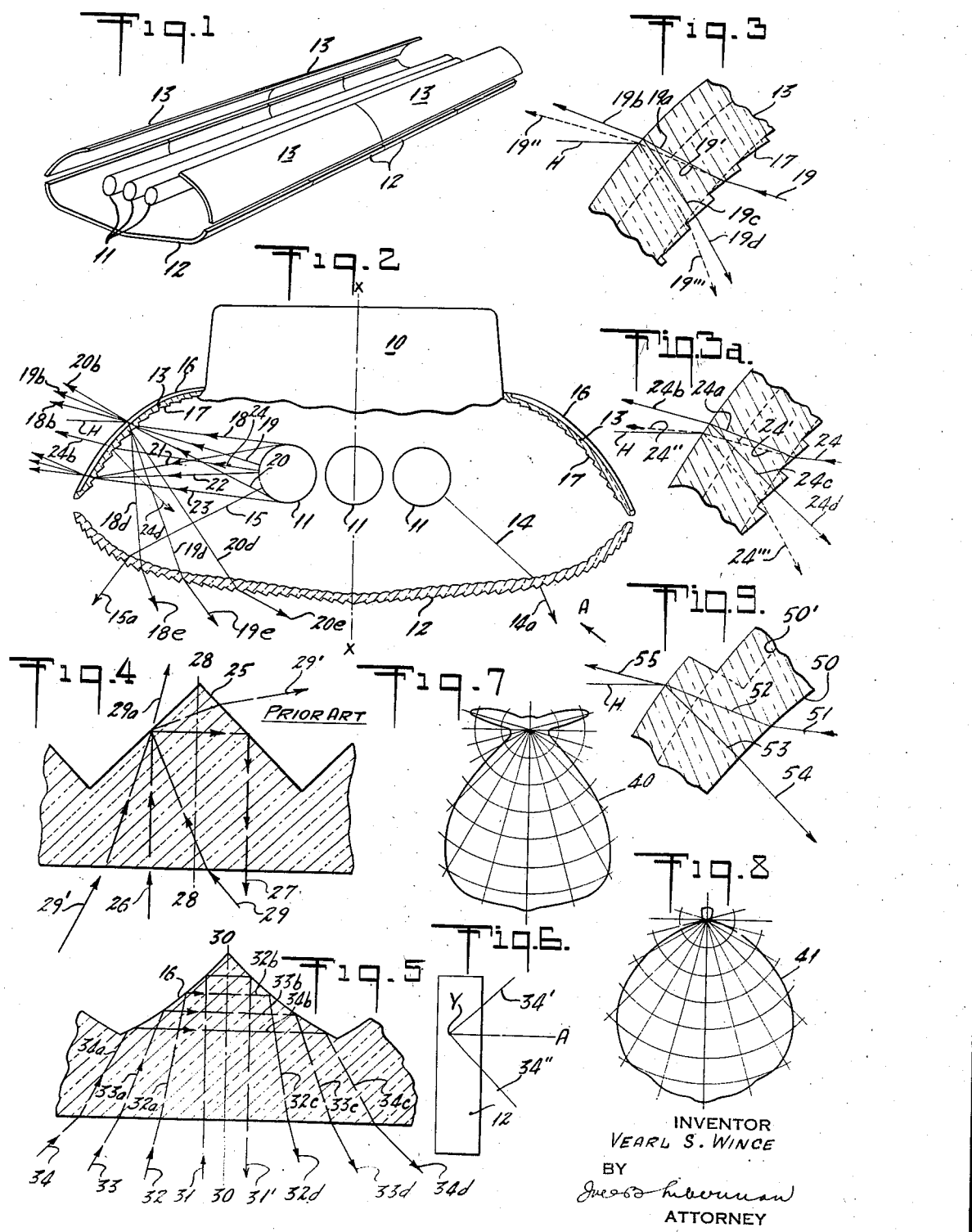
June 28, 1949.     V. S. WINCE     2,474,341
SURFACE ATTACHED FLUORESCENT LIGHTING LUMINAIRE
Filed Nov. 29, 1946
INVENTOR
VEARL S. WINCE
BY
ATTORNEY Patented June 28, 1949

UNITED STATES PATENT OFFICE 2,474,341

SURFACE ATTACHED FLUORESCENT LIGHTING LUMINAIRE

Vearl S. Wince, Newark, Ohio, assignor to Holophane Company, Inc., New York, N. Y., a corporation of Delaware Application November 29, 1946, Serial No. 713,125

13 Claims. (Cl. 240—93)

1

The present invention relates to surface attached fluorescent lighting luminaires, and is more particularly directed toward totally enclosed luminaires using long light sources and arranged for both direct and indirect lighting.

It has heretofore been customary to employ lenses below fluorescent lamps to control the distribution of light in planes transverse of the lamps, and to employ metal or porcelain enameled or painted reflectors about the lamps to direct upwardly emitted light generally downwardly onto the lenses. When such luminaires are viewed from lateral positions below the lenses the contrast in brightness of the near and remote side of the lenses is comparatively low, for the light scattered about inside the reflector falls on the remote side of the lenses at angles which permit the lenses to send some light across the longitudinal vertical median plane through the luminaire.

Such luminaires, however, were unsuited for obtaining an upward component of light. Where an indirect lighting component is desired from totally enclosed lighting fixtures the employment of light transmitting elements of glass or other light transmitting medium above and lateral of the lamps is indicated. Not all forms of the same are suitable for the purpose because they may introduce undesired brightness on their surfaces and may reduce the light directed onto the lower plates needed to maintain them at desired all over brightness.

According to the present invention the luminaires are provided with light transmitters in the form of prismatic reflectors which emit an upward component of illumination at higher angles than the direct light from the lamps falling on them, and the light they reflect downwardly is in such controlled directions as to fall on the lower lens plates at angles which permit transmission across the luminaire axis.

The invention also contemplates prismatic reflectors having totally reflecting prisms capable of totally reflecting light converging toward the prisms at wide angles to their median planes. Thus the oblique rays are reflected so as to produce a more even lighted appearance pattern on the lower lenses through a wide lateral range of observation.

Other and further objects will hereinafter appear as the description proceeds.

The accompanying drawings show, for purposes of illustrating the present invention, an embodiment in which the invention may take form, together with modifications of certain parts, it being understood that the drawings are illustrative of the invention rather than limiting the same.

In these drawings:

Figure 1 is a perspective view diagrammatically illustrating the luminaire;

Figure 2 is a transverse sectional view showing typical ray paths;

Figures 3 and 3a are fragmentary transverse sectional views through one form of top reflector;

Figure 4 is a fragmentary transverse sectional view of the typical prior art totally reflecting prism;

Figure 5 is a fragmentary transverse sectional view through an improved form of totally reflecting prism;

Figure 6 is a diagrammatic inverted plan view of the luminaire;

Figure 7 is a photometric chart illustrating distribution of light across the luminaire;

Figure 8 is a similar chart illustrating distribution of light lengthwise of the luminaire; and Figure 9 is a view similar to Figure 3 illustrating a modified form of reflector.

In the present application features of the luminaire other than the light controlling features, are omitted. A suitable form of construction for supporting the light controlling parts is shown in application for patent for Surface attached lighting equipment, Serial No. 713,126, filed by Kurt Franck and Vearl S. Wince, on even date herewith.

The body of the fixture is indicated at 10. It supports fluorescent lamps indicated at 11, lower prismatic plates 12, and upper prismatic plates 13—13. The lower lens plates 12 direct the direct light toward the nadir as indicated by the rays 14—14a, 15—15a. The plates 13—13 intercept direct light above the plane through the bottom of the lamps and up to an angle of about 45° above the side lamps. Some of this light is below the horizontal and if its direction were not changed, it would proceed slightly below the horizontal causing comparatively bright conditions. To redirect this light in more useful directions, the plates 13 are provided with vertical, totally reflecting external prisms 16 and are provided with a prismatic profile which may appear either on the inside of the reflectors 13 as shown in Figures 2, 3 and 3a, as indicated at 17, or on the outside of the reflectors as shown in Figure 9.

As shown in Figures 2, 3 and 3a transverse of the lamps, direct light rays such as 18, 19, 20, 21, 22, 23, 24, fall on the inner surface of the reflectors 13. Where the longitudinal prismatic ridges are on the inside of the reflectors and upwardly thickening, as indicated in Figures 2, 3 and 3a, the rays are refracted upwardly, as indicated by the typical rays 19 and 24, and fall on the the totally reflecting prisms 16 making up the outer surface of the reflector 13. A portion of these rays is transmitted through the transparent medium, typically glass, and these rays have the same vertical angle as they would have if the outside surface were smooth. Such transmitted rays are indicated at 18b, 19b and 20b, 24b. These rays are at a higher angle above the horizontal H than the corresponding rays 18, 19, 20 and 24 owing to the refraction occurring at the incident surface having the prisms 17.

The dominant portion of the light in the rays 19a and 24a, typical rays in the glass, is, however, reflected by the totally reflecting prisms, back into the glass as indicated at 19c, 24c. These rays pass through the refracting prisms 17 and enter the space inside the luminaire with comparatively steep vertical angles such as indicated at 18d, 19d, 20d, and 24d and fall on the lower glass plate 12 at comparatively steep angles. They are refracted by the prisms of this plate across the vertical axis XX of the luminaire so that an observer looking at the luminaire from a suitable distance below the luminaire and in the direction indicated by the arrow A (Figure 2) will receive considerable light from the left or opposite side of the bottom plates of the luminaire.

This effect is much more pronounced than would be the case if the upper plate 13 were a diffuser or were a prismatic reflector in which the profiles of the inner and outer surfaces were parallel. To illustrate the deviation caused by the prisms 17 as compared with the direction such a ray as 19 or 24 would take if there were no prisms 17, Figures 3 and 3a show in dotted lines such a light ray at 19′, 19″, 19‴, and 24′, 24″, 24‴. In the absence of refracting prisms such as 17, the transmitted light would have the same vertical angle as the direct light, and toward the bottom of the reflector much of it would be below the horizontal H, providing high brightness in that region. As the reflected rays 19‴ and 24‴ are considerably nearer nadir inside the luminaire, they would not tend to provide brightness on the side of the luminaire remote from the observer.

If the light rays to be controlled were all in the transverse planes of the luminaire, the outer prisms 16 could take the usual form of a 90° totally reflecting prism such as indicated at 25 in Figure 4. Such a prism would accept an incident ray such as 26 and return it as indicated at 27 parallel to itself but in different planes corresponding with the obliquity of the ray 26 to the incident surface. Such 90° angle prisms, however, are suitable only when the incident rays are nearly parallel to the plane 28—28 of symmetry of such 90° prisms. For example, light rays such as 29, 29′ strike the surface of the 90° prism at angles such as to escape as indicated at 29a and 29a′, respectively. Owing to the length of the fluorescent lamp, much of the light falling on any elemental area of the reflector 13 comes from remote areas on the lamp and hence has substantial angles of incidence measured in longitudinal planes and, therefore, cannot be handled by conventional 90° totally reflecting prisms.

Figure 5 illustrates an improved form of totally reflecting prism 16 adapted to totally reflect light rays converging toward the area opposite the prism from points on the lamps distant from the median plane 30—30 of the prism. Rays converging through an angle toward the prisms so as to have angles of incidence up to 45° are indicated by rays 31, 32, 33, 34. Rays such as 31 near the axial plane strike the outer surface near the apex of the prism where it has an angle of 90° and are returned as indicated at 31′ in directions parallel with the axial plane. The sides of the prism 16, however, do not have the 90° relation, except close to the apex. The sides of the prisms are concaved as indicated in Figure 5 so that the refracted rays 32a, 33a, 34a, corresponding with rays 32, 33 and 34, strike the sloping sides of the reflecting prism 16 at such angles as to be reflected across the prism parallel with the entering face. These reflected rays are indicated at 32b, 33b and 34b. They strike the opposite face of the prism at angles suitable for total reflection and are returned toward the incident face as indicated at 32c, 33c and 34c, and are transmitted through the inner surface of the reflector as indicated at 32d, 33d and 34d. The light reflected back into the luminaire thus diverges from the plane 30—30 to the same extent that the entering light converged. The light received by an elemental area of the reflector from the lamp to one side of the plane 30—30 through this area, is, therefore, transmitted back into the luminaire the other side of the plane 30—30, and it is therefore apparent that the reflectors are such as to accept light travelling in oblique directions with respect to the length of the luminaire and reflect this light in corresponding oblique directions.

The action of the prisms illustrated in Figure 5 is diagrammatically illustrated in Figure 6 where the luminaire is illustrated from underneath. Any point such as Y on the lower surface of the plate 12 on the side remote from the observer receives reflected light from directions up to 45° each side of the transverse plane through the luminaire and the lower plates transmit this light with altered vertical angle depending upon the prismatic configuration of the lower plate but without affecting its spread away from the transverse plane. Thus, from such point Y one obtains divergent light rays between lines such as 34′, 34″, corresponding in direction with the rays 34—34d. Thus the entire lower surface of the plates 12 transmits in addition to the dominant downward light rays 14a, 15a, additional light rays such as 18e, 19e, 20e, which cross the luminaire axis and have wide divergence from the transverse plane as indicated by the rays 34′, 34″. This brings about brightness of the remote side of the luminaire which is much higher than would have been the case were less efficient forms of reflector employed. This increase in brightness occurs over comparatively long areas of the luminaire when the luminaire is viewed at angles within 45° from the transverse plane.

The over all result of the prismatic constructions described above, is illustrated in the photometric curves 40 and 41 of Figures 7 and 8, respectively. The curve 40 shows the light distribution in transverse planes and indicates that there is a substantial light output concentrated in the general direction of about 15° above the horizontal. This light is very effective in obtaining upward illumination particularly of a ceiling at or close to the top of the body 10 of the luminaire. Owing to the upward direction of the light, the brightness of the reflectors 13, while substantial, is comparatively low.

In the modification of the reflector illustrated in Figure 9, the inner surface 50 of the reflector has a smooth profile and the outer surface has vertical prisms 50′, stepped as indicated. Incident rays such as 51, corresponding in position with ray 24, are refracted on entering the reflector and directed toward the outer surface as indicated at 52. These rays are in part reflected as indicated at 53, and refractively transmitted as shown at 54, and in part transmitted as indicated at 55. The action is similar to that of Figures 3 and 3a. The construction with smooth outer profile is preferable where fixture design indicates a steep profile while the inner smooth profile is suitable for designs where the profile is flatter.

Since it is obvious that the invention may be embodied in other forms and constructions within the scope of the claims, I wish it to be understood that the particular form shown is but one of these forms, and various modifications and changes being possible, I do not otherwise limit myself in any way with respect thereto.

What is claimed is:

1. A fluorescent lighting luminaire having a horizontal rectilinear fluorescent lamp, and a reflector parallel with the lamp and occupying a zone of substantial angular width extending upwardly from substantially the level of the bottom of the lamp so as to intercept lower angled upwardly directed light, the reflector having a predetermined general profile having a series of external, vertical, totally reflecting prisms crossed by a series of upwardly thickening horizontal refracting prisms forming a stepped profile on one surface, the series of refracting prisms cooperating to elevate both the transmitted light emitted through the upper surface and the reflected light emitted through the lower surface as compared with the directions obtainable with a reflector of like profile smooth both inside and out.

2. A fluorescent lighting luminaire as claimed in claim 1, wherein the stepped profile is on the inner surface.

3. A fluorescent lighting luminaire as claimed in claim 1, wherein the stepped profile is on the outer surface.

4. A fluorescent lighting luminaire comprising the combination with a horizontal light source, and a refractor intercepting downwardly emitted light and having longitudinal prisms each thickening toward the longitudinal median plane and which deviate direct light toward nadir so that more light is transmitted from the near side of the luminaire toward an observer lateral of and below the luminaire than from the remote side whereby the near side is brighter at such angles of observation than the remote side, of means for building up the brightness of the remote side of the fixture comprising a downwardly and outwardly flaring, externally vertically ribbed, prismatic, light reflecting cover intercepting low angle light above the horizontal and having internal longitudinal refracting prisms on one of its surfaces each thickening toward the longitudinal median plane and which act to elevate the reflected light transmitted through its lower surface so that it is directed toward the refractor at greater angles from the nadir than by a transversely smooth surfaced reflector of the same general profile.

5. An elongated luminaire having a rectilinear fluorescent lamp, a rectilinear light concentrating lens below the lamp with regressed light concentrating prisms for deviating direct light toward the nadir whereby the side of the lens nearer a laterally positioned observer below the luminaire directs substantially more of the direct light toward the observer than the remote side of the lens, and internally concave, specular, prismatic reflectors above the sides of the lens in a position to accept low angle direct light above the horizontal and having longitudinal refracting prisms each thickening toward the longitudinal median plane and which elevate entering rays as well as the emergent reflected rays whereby they are directed toward the lens at angles higher than rays from a transversely smooth reflector of the same general profile for transmission by the lens across the vertical axis through the luminaire to increase the brightness of the side of the lens remote from the observer.

6. An elongated luminaire as claimed in claim 5, wherein the reflector has external, vertical symmetrical, totally reflecting prisms with sides at an angle of 90° at the apex and at increasing angle remote from the apex.

7. The combination with a horizontal elongated light source of a prismatic reflector parallel with the light source, the reflector having a series of relatively small totally reflecting prisms extending vertically on its outer surface, the sides of the prisms being at 45° to the median plane through the prisms at the apex of the prisms so as to totally reflect light substantially normal to the inner surface opposite the prism and at increasing angles remote from the apex so as to totally reflect light converging toward the prism.

8. A luminaire having an elongated horizontal light source, a refractor under the light source having regressed light concentrating prisms which deviate the direct light received thereby toward the nadir, and upper reflectors laterally of the source and above the lower refractor, the upper reflectors having a series of external, vertical, totally reflecting prisms, crossed by a series of internally disposed upwardly thickening, horizontal refracting prisms which increase the angle of incidence of direct light and the angle of refraction at the entering surface, decrease the angle of incidence and reflection at the outer surface and decrease the angle of incidence and of refraction of reflected light at the emergent surface and direct this light onto the lower refractor at higher angles than a reflector of the same general profile and smooth inner surface.

9. The combination with a horizontal fluorescent lamp of a reflector concave toward the source and extending upwardly and inwardly from a region substantially level with the bottom of the lamp to intercept low angle light above the horizontal, the reflector being composed of transparent light transmitting material and having a smooth profiled outer surface composed of adjacent totally reflecting vertical ridges and an inner surface composed of longitudinally extending refracting ridges with incident faces less steep than the opposed outside profile whereby increased upward deviation of the light rays is obtained at the first refraction on entering the reflector and decreased downward deviation at the second refraction on leaving the reflector.

10. The combination with a rectilinear light source of a reflector made of a transparent light transmitting medium extending parallel with the source disposed to intercept a wedge of direct light from the source and having an inwardly concave, non-concentric profile, the reflector having a series of external, vertical, totally reflecting prisms crossed by a series of upwardly thickening horizontal refracting prisms forming a stepped profile on one surface, the series of refracting prisms cooperating to elevate both the transmitted light emitted through the upper surface and the reflected light emitted through the lower surface as compared with the directions obtainable with a reflector of like profile smooth both inside and out, each side of each reflecting prism being inwardly convex and disposed at variant angles to the refracted rays in the medium greater than the critical angle of the medium to produce total reflection and such as to reflect the convergent rays incident thereon in directions parallel with the light incident face and toward the opposite side of the prism for total reflection thereby toward the light incident face with divergence corresponding with their convergence before the first reflection and for refractive transmission on the other side of the normal plane with divergence corresponding with the convergence of the original ray.

11. A reflector made of a transparent light transmitting medium and having a rectilinear light incident face adapted to receive light rays converging on elemental surfaces thereof from an elongated source parallel with the light incident face, and extending both sides of the plane normal to the said surface at said surface and to refractively deviate and transmit said converging rays toward the opposite face with decreased angles of convergence, the opposite face being in the form of a symmetrical reflecting prism extending in the direction of said normal plane, each side of each reflecting prism being inwardly convex and disposed at variant angles to the refracted rays in the medium greater than the critical angle of the medium to produce total reflection and such as to reflect the convergent rays incident thereon in directions parallel with the light incident face and toward the opposite side of the prism for total reflection thereby toward the light incident face with divergence corresponding with their convergence before the first reflection and for refractive transmission on the other side of the normal plane with divergence corresponding with the convergence of the original ray.

12. A prismatic reflector for use with a normally horizontal long light source, the reflector having external vertical symmetrical ribs with their sides at an angle of 90° near the apex and at increasing angles remote from the apex.

13. The combination with a horizontal fluorescent light source of light transmitting reflectors on each side of the source, of inwardly concave profile which intercept direct light at low angles above the horizontal at substantial angles of incidence and have externally disposed vertical reflecting prisms which reflect a substantial portion of the light downwardly and inwardly toward the nadir and allow a portion of the light to escape outwardly, and wherein one of the surfaces of the reflector has longitudinally extending refracting prisms each thickening toward the longitudinal median plane and elevating the light in its passage through the reflector so that the escaping light is at higher angles than the corresponding direct light.

VEARL S. WINCE.

REFERENCES CITED

The following references are of record in the file of this patent:

UNITED STATES PATENTS

| Number | Name | Date |
| --- | --- | --- |
| 1,799,290 | English | Apr. 7, 1931 |
| 2,281,377 | Ohm | Apr. 28, 1942 |